UNITED STATES PATENT OFFICE.

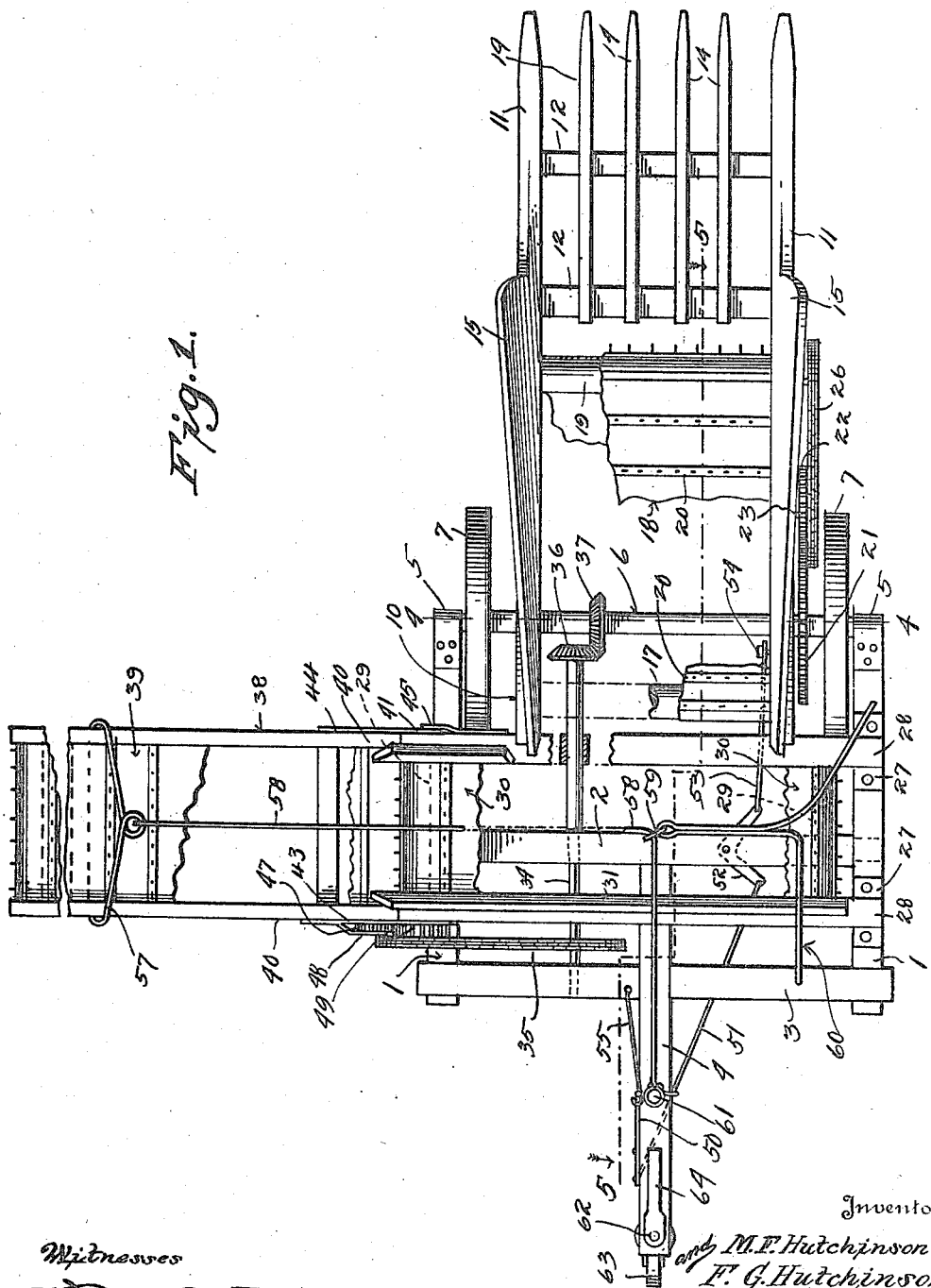

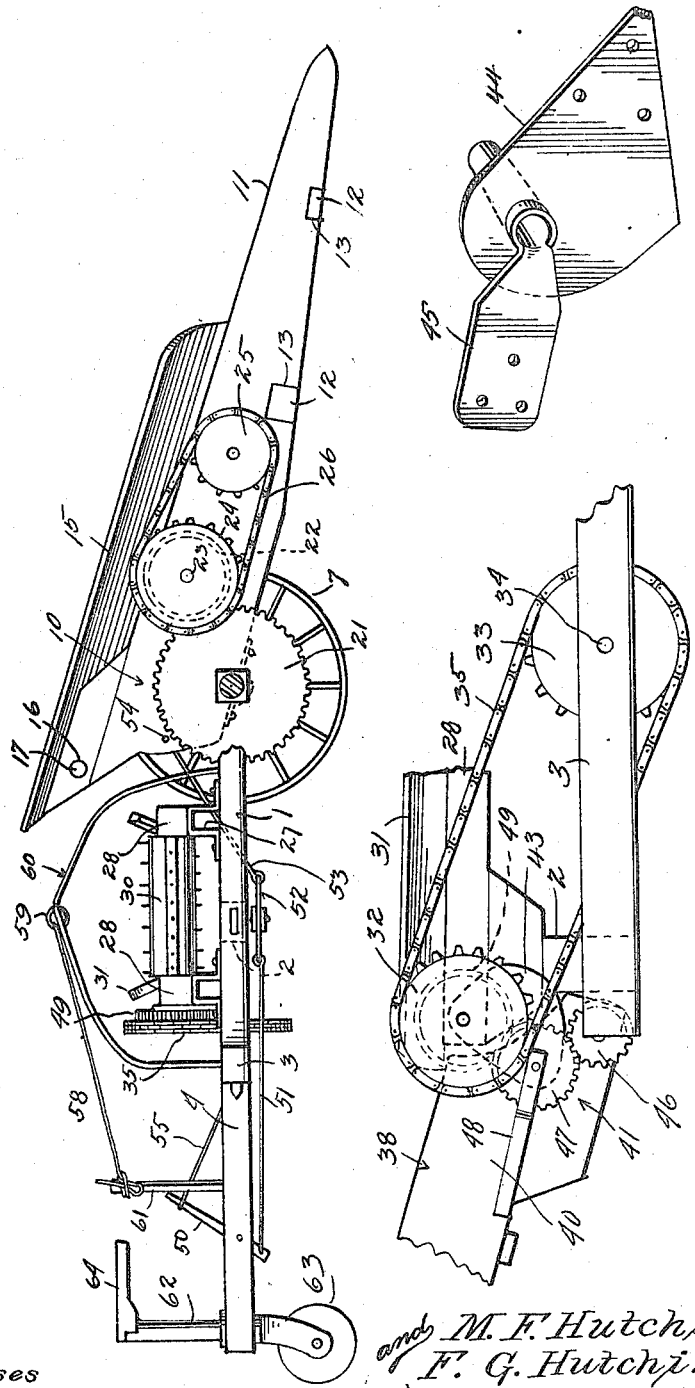

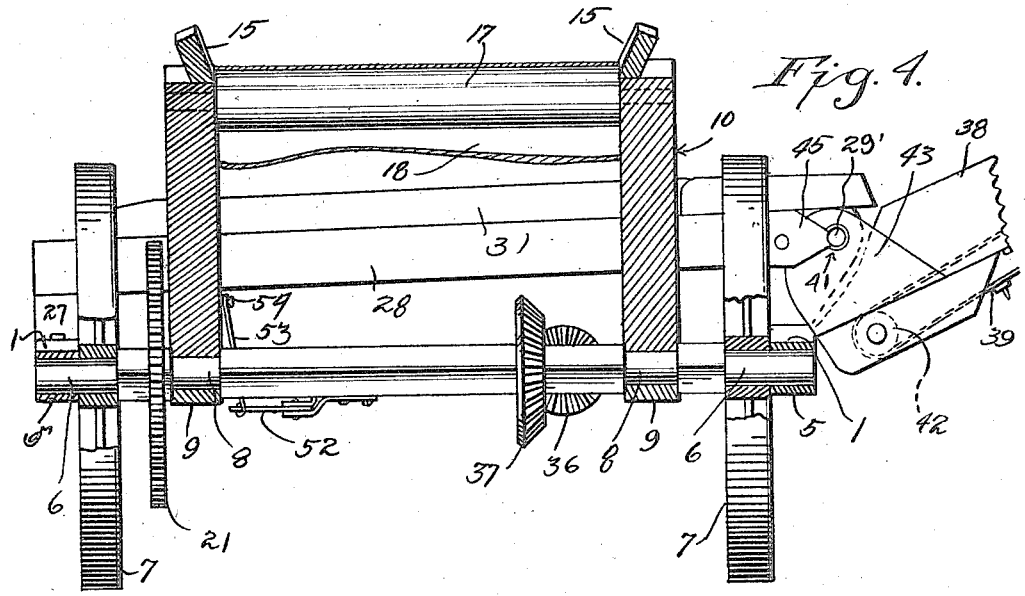

MERRILL F. HUTCHINSON AND FRANCIS G. HUTCHINSON, OF CLEARWATER, KANSAS.

HAY AND BUNDLE LOADER.

1,268,122.  Specification of Letters Patent.  Patented June 4, 1918.

Application filed September 19, 1916. Serial No. 121,007.

*To all whom it may concern:*

Be it known that we, MERRILL F. HUTCHINSON and FRANCIS G. HUTCHINSON, citizens of the United States, residing at Clearwater, in the county of Sedgwick, State of Kansas, have invented certain new and useful Improvements in Hay and Bundle Loaders; and we do hereby declare the following to be a full, clear, and exact description of the invention such as will enable others skilled in the art to which it appertains to make and use the same.

This invention relates to loading machines, and has particular reference to a machine for loading hay or bundled grain upon a wagon or other vehicle.

The primary object of the invention is to provide a simple and effective structure for picking up all kinds of hay from swaths or windrows, or to gather up shocks or bundles of grain and the like and depositing the gathered material in a wagon which is driven alongside of the machine. In connection with this object, it is contemplated to provide a machine which may be readily steered into position to gather the hay or grain, and in which the several parts are under ready control of the driver or operator. The machine comprises, generally, a gathering fork and a suitable combination of conveyers which elevate and change the position of the grain from the ground to loading height rapidly and efficiently.

With the above objects in view and such other objects as may hereinafter appear our invention will now be fully set forth and described, reference being had to the accompanying drawings.

In the drawings:—

Figure 1 is a plan view,

Fig. 2 is a side view, partly broken away for the sake of clearness,

Fig. 3 is a detail view of gearing,

Fig. 4 is a section on line 4—4 of Fig. 1,

Fig. 5 is a section on line 5—5 of Fig. 1, and

Fig. 6 is a detail showing of the manner of mounting the rake.

Referring more particularly to the drawings, 1 denotes the longitudinal beams of a frame work which are joined by an intermediate transverse beam 2. The rear extremities of the longitudinal beams 1 are connected by a second transverse beam 3, and a rearwardly projecting tongue 4 spand the middle points of the transverse beams 2 and 3. The forward ends of the longitudinal beams 1 are shaped in the bearings 5 in which is journaled the axle 6, the latter between the beams 1 carrying the traction wheels 7. Between the traction wheels 7, the axle 6 is provided with journals 8 around which are secured the bearings 9 of a vertically oscillatory frame 10. The frame 10 consists of the forwardly tapered sides 11 and the transverse stringers 12 which are entered into recesses 13 formed in the lower edges of the sides 11 at suitable points to carry the teeth 14. The forward tapered ends of the sides 11 and the teeth 14, which are suitably spaced between the latter and provide a pick-up for hay and grain either in windrows, cocks, or shocks. The upper rear ends of the sides 11 are continued backwardly over the main frame for a definite distance, and are furthermore built up over the rearwardly extended portion by means of the outwardly flared side boards 15. The upper rearwardly extended ends of the sides 11 are provided with bearings 16 in which are journaled the upper rollers 17 of an endless conveyer 18, whose opposite end is carried by a roller 19 journaled in the intermediate portions of the sides 11 directly behind the rear ends of the teeth 14 so that grain received by the latter will be shoved upon the lower end of the conveyer and carried upwardly thereby. The conveyer 18 carries the transverse toothed or pronged slats 20 of well known form. The conveyer 18 is driven by means of a gear 21 mounted upon the axle 6 between the wheel 7 and the corresponding side 11, the gear 21 meshing with a gear 22 on a stud shaft 23 fixed in the side 11. Also mounted upon the stud shaft 23 is the sprocket wheel 24 which is geared to a sprocket 25 on the lower roller 19, a chain 26 being employed to connect the sprockets 24 and 25. Thus, when the machine is in motion, the endless belt or conveyer 18 is constantly driven. Upon the longitudinal beams 1 are formed or mounted the bases 27 which provide elevating supports for the transverse stringers 28, the latter supporting, in suitable journals, the rollers 29 of a transverse endless conveyer 30. The conveyer 30 has one longitudinal edge located just below the delivery end of the endless conveyer 18, so as to receive the hay or grain delivered from the latter in position to carry it directly across the machine.

Upon the side opposite of the delivery end to the endless conveyer 18, the stringer 28 is provided with a baffle or guard 31 which prevents the hay or grain from being thrown over the side of the conveyer 30. The axle of the forward roller 29 of the conveyer 30 is extended to receive in rigid relation the sprocket wheel 32, which is geared to a sprocket 33 mounted upon the shaft 34 carried longitudinally out of the main frame and being journaled in the transverse beams 2 and 3. The sprocket wheel 33 is located inside the beam 3, and in line with the sprocket 32 so that a chain 35 may properly gear them together. The forward end of the shaft 34 carries a beveled gear 36 which meshes with a correspondingly formed gear 37 on the axle 6, provision being thereby made for the constant driving of the endless conveyer 30.

Mounted upon the stringers 28 at the delivery end of the conveyer 30 is a swinging frame 38 which carries an endless conveyer 39 whose receiving end is extended below the delivery end of the conveyer 30. Thus, the sides 40 of the frame 38 are provided with bearing elements 41 which underlie the delivery end of the conveyer 30 and have journaled therein, the lower roller 42. To one side of the frame 38 is secured the bearing bracket 43 which is journaled upon the shaft of the roller 29 at the discharge end of the endless conveyer 30 so as to swing upon the latter. The opposite side of the frame 38 carries the bearing plate 44 which is journaled upon the opposite end of the shaft 29', a securing plate 45 mounted upon the side of the stringer 28 fitting over the projecting end of the shaft of the roller 29 and holding the bearing plate 44 in position. The end of the shaft of the lower roller 42 extends beyond the bearing element 41, and has secured thereon the pinion 46 which meshes with a second pinion 47 mounted in a bracket 48 upon the side of the frame 38, and in turn meshes with the gear 49 fixed upon the shaft of the roller 29. Since the pivotal axis of the frame 38 is coincident with the axis of the roller 29, the pinion 47 will be constantly meshed with the pinion 49 whatever the position of the frame 38 with regard to the frame 30. Thus, provision is made for the constant driving of the conveyer 39.

In order to provide for the raising and lowering of the front end of the frame 10, so as to properly position the teeth 14, a hand lever 50 is mounted upon the rearwardly projecting end of the tongue 4, and has its lower ends connected by means of a connecting rod 51 with one arm of a bell crank lever 52 mounted upon the lower side of the transverse beam 2. The opposite arm of the bell crank lever 52 is connected by means of a connecting rod 53 to a stud 54 projected from the inner face of the side 11 of the frame 10, in such position that when the rod 51 is thrown forwardly by manipulation of the hand lever 50, the rear end of the frame 10 will be thrown downwardly so as to elevate the ends of the teeth 14. A suitable locking element 55 mounted adjacent the hand lever 50 provides for the suitable fixing of the latter in its various positions of adjustment.

Secured to the frame 38 and near the upper end of the conveyer 39 is a yoke 57 to which is connected the cable 58 which extends thence to a ring 59 carried by an overhanging frame 60, which brings the end of the cable in the position to be secured to a post 61 mounted upon the forward end of the tongue 4 to which it may be lashed. Thus, a convenient means of adjusting the inclination of the frame is provided, so that the outer end of the latter may be properly adjusted to deliver the grain or hay into the wagon body which is being driven alongside of the machine.

In order to steer the machine, a steering post 62 is journaled at the rear end of the tongue 4 and carries at its lower end the steering wheel 63, a tiller 64 being mounted upon the upper end of the steering post 62 so as to extend into handy relation with the hand lever 50 and the post 56.

From the foregoing it is clear that we have devised an improved and simplified form of grain gathering mechanism, and since it is constructed of comparatively few parts and of simple mechanism, its cost of production need not advance above a comparatively low figure.

What we claim is:—

1. A loading machine, comprising in combination, a frame work including a pair of longitudinal side beams, having forward projections, an axle journaled on the ends of said projections, traction wheels fixed on said axle, a frame swinging on said axle and extending forwardly from the main frame, a set of rake teeth mounted between the sides of the swinging frame, a conveyer also mounted on said swinging frame and extending rearwardly from said rake teeth to overlie the axle, a transverse conveyer on the main frame and fed by the conveyer on said swinging frame, a laterally projecting conveyer pivoted on said main frame and extending from said transverse conveyer, a gear connection between the axle and one of the rollers of the conveyer on the swinging frame and a countershaft geared to the axle to drive the transverse and laterally pivoted conveyers.

2. A loading machine, comprising in combination, a main frame having a pair of forwardly extending elements, an axle journaled in the forward extremities of said elements, traction wheels on said axle mounted between said elements, a frame journaled on said axle also between said elements, rake teeth and a conveyer associated therewith carried by said journaled frame said conveyer extending rearwardly over the axle, a transverse conveyer on the main frame, fed by the first mentioned conveyer, a laterally extending pivoted conveyer associated with said transverse conveyer, means for driving all of said conveyers from said axle, and means for raising and lowering said journaled frame and said pivoted conveyer.

In testimony whereof, we affix our signatures in the presence of two witnesses.

MERRILL F. HUTCHINSON.
FRANCIS G. HUTCHINSON.

Witnesses:
  JESSE UHLER,
  DEL BERTRAND.